July 28, 1970 — G. J. KANDEL ET AL — 3,521,788
FOOD CONTAINER
Filed Nov. 12, 1968 — 2 Sheets-Sheet 1

INVENTORS
GERALD J. KANDEL
PAUL H. CARTER
HERBERT M. BANK

BY Albert J. Kramer
ATTORNEY

July 28, 1970  G. J. KANDEL ET AL  3,521,788
FOOD CONTAINER
Filed Nov. 12, 1968  2 Sheets-Sheet 2
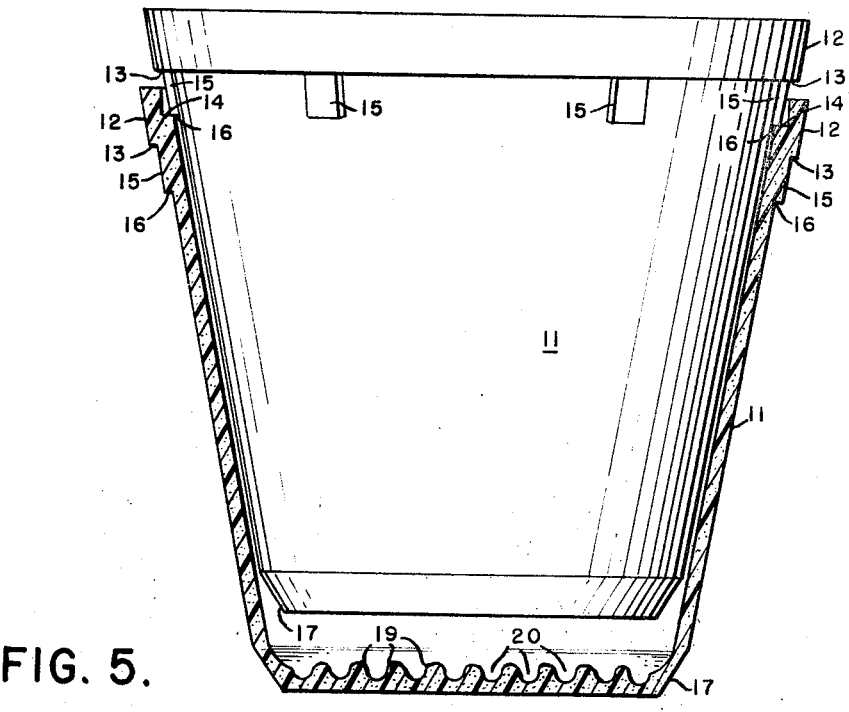
FIG. 5.
FIG. 7.
FIG. 6.
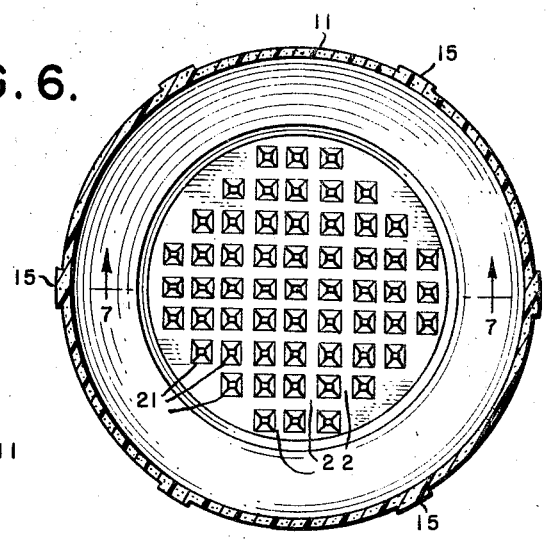
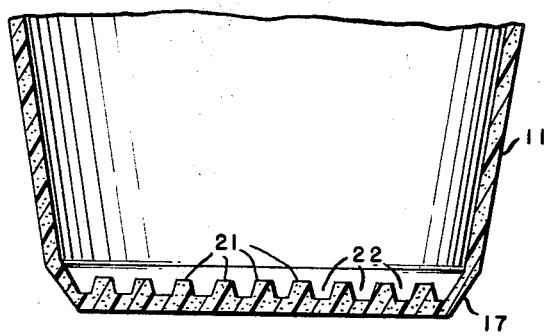
INVENTOR:
GERALD J. KANDEL
PAUL H. CARTER
HERBERT M. BANK
BY *Albert J. Kramer*
ATTORNEY United States Patent Office 3,521,788
Patented July 28, 1970

3,521,788
FOOD CONTAINER
Gerald J. Kandel, Paul H. Carter, and Herbert M. Bank, Baltimore, Md., assignors to Maryland Cup Corporation, Owings Mills, Md., a corporation of Maryland
Filed Nov. 12, 1968, Ser. No. 774,621
Int. Cl. B65d 1/22, 21/00
U.S. Cl. 220—72
5 Claims

ABSTRACT OF THE DISCLOSURE

A container for hot food for the carryout trade is provided of thermally insulated material such as foamed polystyrene. The container is of conventional inverted frusto-conical shape to permit group nesting. The upper rim is offset outwardly to provide a downwardly facing shoulder at the outside and an upwardly facing shoulder on the inside. Projections in spaced circumferential relation are disposed below the downwardly facing shoulder to contact the upwardly facing shoulder of a nested container and thereby hold the adjacent side walls of juxtaposed containers against wedging engagement. Also it permits separation when desired by avoiding a suction between the container. The upwardly facing shoulder also acts as a rest for a lid for the container which may have vents to permit the escape of steam and to serve as finger holes for removing the lids when access to the interior of the container is desired. The side wall at the bottom is also beveled further to prevent wedging of nested containers. The bottom wall comrpises upward projections such as ridges or fingers to support the contents off the bottom in an elevated position and to permit air to circulate below the food as well as to function as a sump to collect fat drippings.

---

This invention relates to containers and it is more particularly concerned with thermally insulated containers for carrying food and maintaining them at temperatures different from the ambient atmosphere for substantial periods.

An object of the invention is the provision of a container especially adapted to the carryout food trade such as cooked poultry, spare ribs, crab cakes, fish sticks, shrimp, oysters, scallops, and similar products.

Another object of the invention is the provision of a container for the purpose indicated which comprises features which tend to maintain the food in a freshly prepared condition such as fried barbecued, baked, roasted, or other condition.

It is known that when freshly prepared fried chicken, for example, is held for a considerable period in a thermally insulated container, the residual heat tends to surface moisture which softens the crisp exterior of the pieces and hence, to a degree, affects their palatableness.

A feature of the present invention is to provide a container for a mass of food which will overcome to a large extent this undesirable condition of softening crisp hot food in bulk form.

In recent years a substantial industry has developed nationally in the sale of cooked foods in carryout buckets.

These buckets are conventionally made of waxed heavy paper or cardboard. Such buckets are not thermally insulated and hence result in a relatively rapid lowering of temperature of the food from the time it is placed in the bucket at a point of sale until the time it is carried to a point of consumption. The air in the bucket is trapped which causes a steaming of the food in the bucket under the residual heat of the food pieces thereby resulting in a softening of the desired crispness.

It is a further object of the invention to provide a container which will not only retain substantially the residual heat for prolonged periods, but will tend to prevent softening of the crispness of pieces of food therein.

These and still further objects and advantages of the invention will be apparent from the following description considered together with the accompanying drawing.

In the drawing:

FIG. 5 is an elevational view, partly in section, of a nested pair of containers showing the functional characteristics of the offset projections.

FIG. 6 is a plan sectional view, similar to FIG. 4, of an alternative embodiment of the invention.

FIG. 7 is a sectional view along the line 7—7 of FIG. 6.

Figure 1:
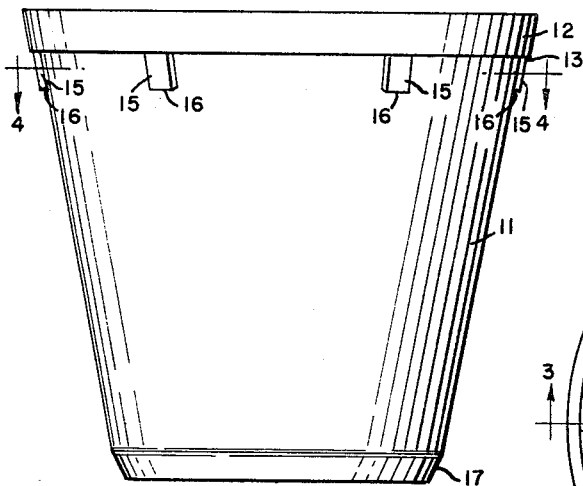
FIG. 1 is a front elevational view of a container comprising an embodiment of the invention.
Figure 2:
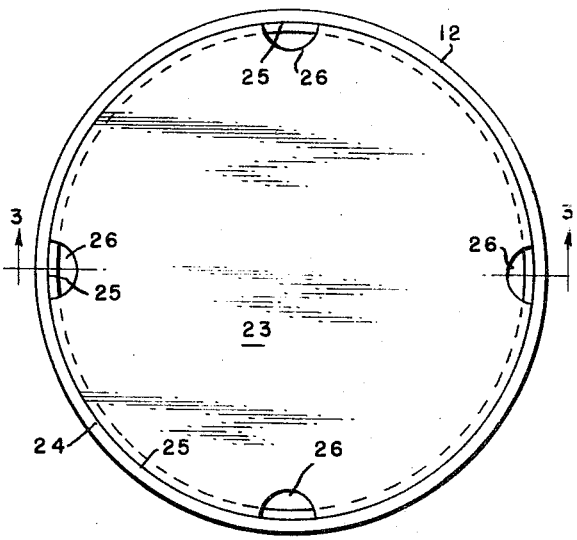
FIG. 2 is a top plan view of the embodiment.
Figure 3:
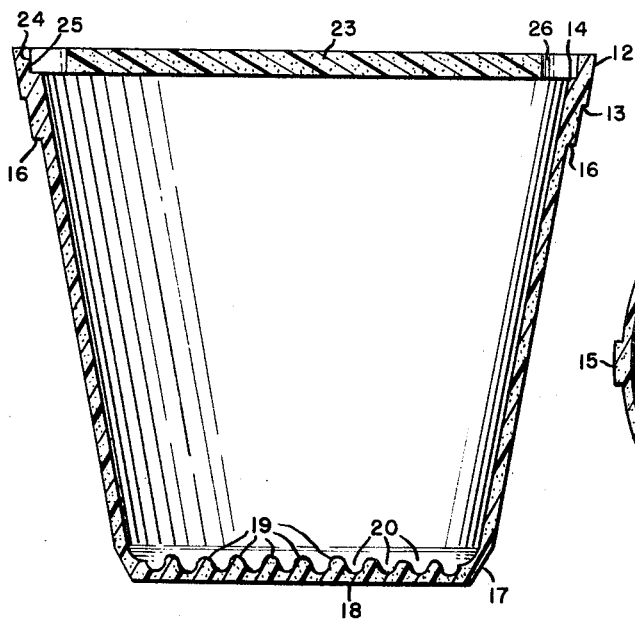
FIG. 3 is a cross sectional view along the line 3—3 of FIG. 2.
Figure 4:
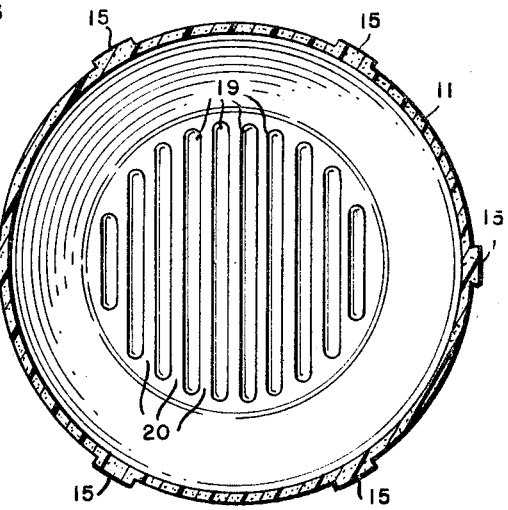
FIG. 4 is a plan sectional view along the lines 4—4 of FIG. 1.

Referring with more particularity to the drawing in which like numerals designate like parts, the embodiment illustrated in FIGS. 1–5 comprises a container having a side wall 11 of a generally inverted frusto-conical shape to permit nesting a group of the containers as shown in FIG. 5 to conserve storage space. The container is molded of a thermally insulated material such as conventional foamed polystyrene resin which has a degree of resilient flexibility.

The upper edge of the container is integral with a radially outset annular lip 12 providing a downwardly facing annular shoulder 13 on the exterior and an upwardly facing annular recessed shoulder 14 on the interior.

A group of projections 15 are disposed beneath the shoulder 13 in circumferential spaced relation and extend downwardly, as shown, from the shoulder 13. In addition to strengthening the joint between the lip 12 and the wall 11, these projections are adapted to have their undersides 16 rest upon the annular shoulder 14 of a nested container as shown in FIG. 5 and of a thickness less than the thickness of the shoulder 13 to fit freely inside the annular lip 12.

The lower end of the container is also provided with a recess bevel 17. This bevel combined with the function of the projections 15 prevent nested containers from wedging together and permit their easy separation. This is due partly to preventing the formation of a vacuum between containers by the spaced apart projections 15 and partly by the recessed bevel 17 which keeps the lower ends out of tight wedging engagement.

The bottom wall 18 of the container has its top side provided with an irregular surface such as corrugations 19 which are adapted to increase the rigidity of the bottom wall and to support pieces of hot food, such as fried chicken pieces, in offset relation with sump pockets 20 therebelow to permit venting of steam from the bottom and also to permit the collection of grease drippings away from contact with the food.

Alternatively, stalagmitical or finger projections 21 may be used instead of the corrugations 19 as shown in FIGS. 6 and 7. Such projections increase the volume of sump pockets 22 and provide greater venting capacity in different directions.

A lid 23 may be provided of a circular shape to fit inside the lip 12 and to seat on the shoulder 14 preferably with a friction or wedge fit between the outer edge 24 of the lid and the inner side wall 25 of the lip. Due to the resiliency of the foamed polystyrene resin, irregularities at the edge 24 are compensated by the resilient yielding of the lip 12. The lid 23 may be of heavy cardboard or of a similar foamed plastic material. Vents 26 may be provided in the lid for the release of steam from hot foods. By providing such vents at the edges of the lid, they may be made large enough to function as finger holes to facilitate lifting the lid off the container when it is desired to have access to the interior.

We claim:

1. A food container comprising a relatively thick inverted frusto-conical side wall of a foamed plastic heat insulating material, said side wall having a uniform smooth inner surface, said side wall having a thicker annular portion extending from its outer wall forming a radially outset lip at its upper end, said lip providing a downwardly facing shoulder on the exterior of the lip, a portion of the lip being of reduced thickness to provide an upwardly facing shoulder on the interior of the lip, circumferentially spaced portions of the wall below said lip being of a thickness intermediate of the lip and the side wall forming projections on the exterior of the side wall to fit within the lip and rest on the upwardly facing shoulder of a like nested container with clearance between the projections and the inner surface of the lip of a like nested container, thereby to prevent wedging between the nested containers at their upper ends, the bottom edge of the side wall being beveled to prevent wedging at the lower ends with a like nested container, and a bottom wall integral with the side wall of the same foamed plastic material, said bottom wall having thicker and thinner portions forming spaced projections of thicker portions extending upwardly from the thinner portions and spaced from the inside wall of the container to support hot food and provide ventilation between the food and the thinner portions.

2. A food container as defined by claim 1 in which the projections are thinner than the shoulder.

3. A food container as defined by claim 1 in which the bottom wall projections are in the form of corrugations.

4. A food container as defined by claim 1 in which the bottom wall projections are stalagmitic.

5. A nestable food container as defined by claim 1 in which the bottom projections are in the form of truncated pyramids.

References Cited

UNITED STATES PATENTS

| | | | |
|---|---|---|---|
| 1,693,622 | 12/1928 | Spaulding. | |
| 2,420,215 | 5/1947 | Wiley. | |
| 2,601,767 | 7/1952 | Wall | 220—90.4 |
| 3,067,921 | 12/1962 | Reifers | 229—2.5 |
| 3,094,240 | 6/1963 | Wanderer. | |
| 3,013,306 | 12/1961 | Richie et al. | |
| 3,353,707 | 11/1967 | Eyles. | |
| 3,375,954 | 4/1968 | Honkanen et al. | |

FOREIGN PATENTS

| | | |
|---|---|---|
| 833,719 | 7/1938 | France. |
| 1,044,009 | 6/1953 | France. |

RAPHAEL H. SCHWARTZ, Primary Examiner

U.S. Cl. X.R.

206—46, 47; 220—97; 229—1.5, 2.5